G. H. MYRICK.
VARIABLE RATE METERING MECHANISM.
APPLICATION FILED JAN. 10, 1913.

1,158,709.

Patented Nov. 2, 1915.
2 SHEETS—SHEET 1.

Witnesses:
Robert F. Bracke
Leslie W. Fricke

Inventor
George H. Myrick
By Brown, Williams, Bell, Hanson & Bethel
Attorneys

G. H. MYRICK.
VARIABLE RATE METERING MECHANISM.
APPLICATION FILED JAN. 10, 1913.

1,158,709. Patented Nov. 2, 1915.

Witnesses:
Robert F. Brach
Leslie W. Fricke

Inventor
George H. Myrick
By Brown, Williams, Bell, Hanson & Boettcher
Attorneys

UNITED STATES PATENT OFFICE.

GEORGE H. MYRICK, OF CHICAGO, ILLINOIS, ASSIGNOR TO CHICAGO ELECTRIC METER COMPANY, OF CHICAGO, ILLINOIS, A CORPORATION OF ILLINOIS.

VARIABLE-RATE METERING MECHANISM.

1,158,709.  Specification of Letters Patent.  Patented Nov. 2, 1915.

Application filed January 10, 1913. Serial No. 741,232.

*To all whom it may concern:*

Be it known that I, GEORGE H. MYRICK, a citizen of the United States, residing at Chicago, in the county of Cook and State of Illinois, have invented a certain new and useful Improvement in Variable-Rate Metering Mechanism, of which the following is a full, clear, concise, and exact description, reference being had to the accompanying drawings, forming a part of this specification.

My invention relates to variable rate metering mechanism and its particular object is to provide mechanism, driven from one of the rotating elements of an electricity or other meter of ordinary type, adapted to record in dollars and cents the commercial value of electricity, water, gas, or other fluid passing through the meter. In the sale of electrical energy it is quite common to make a different charge, either greater or smaller, after a predetermined amount of electricity has been consumed, than is charged before said predetermined amount has been consumed. The device of my invention is designed to record a first amount of electricity passed through the meter with which it is associated at one rate, and for excess amounts at a second rate, so as to meet the requirements of the double charge system.

Figure 1:
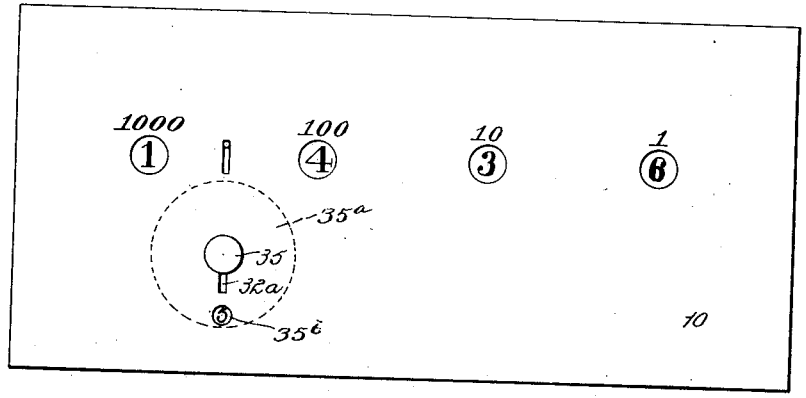
Figure 6:
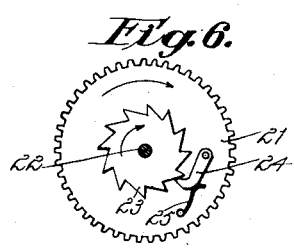
Figure 5:
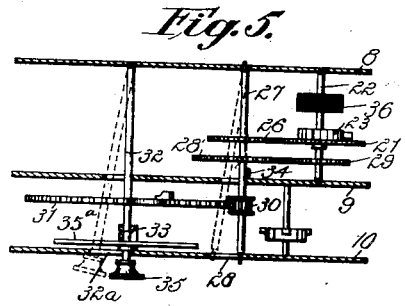
Figure 7:
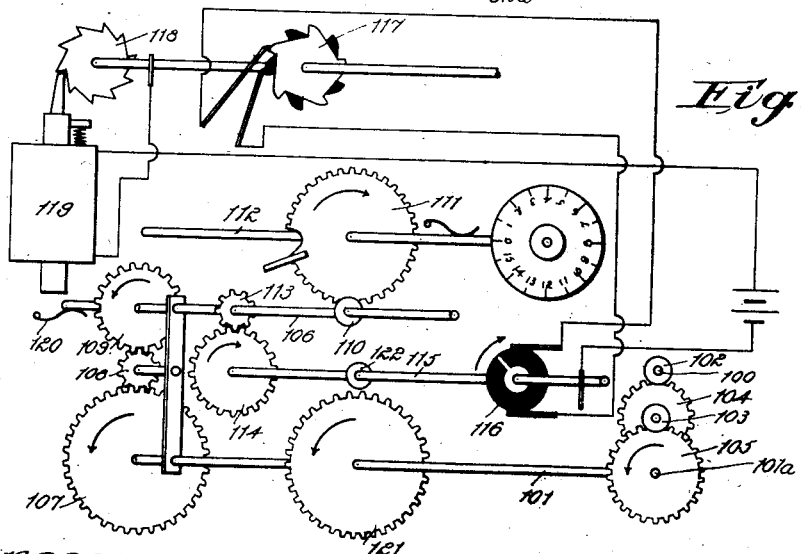
Figure 2:
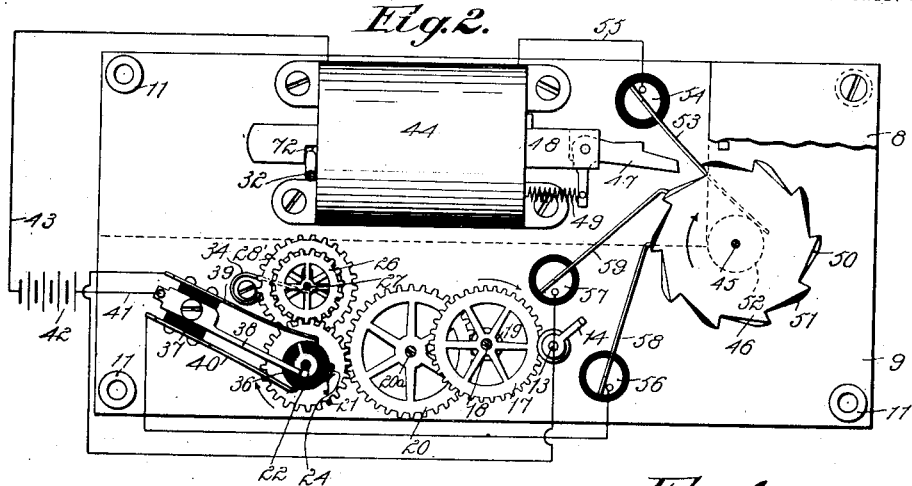
Figure 4:
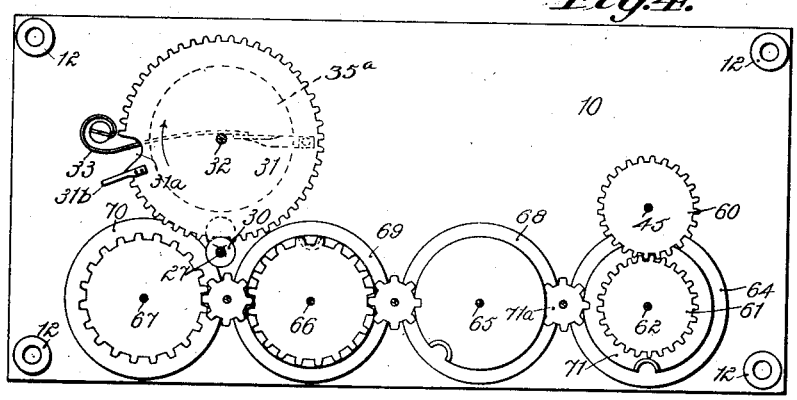
Figure 3:
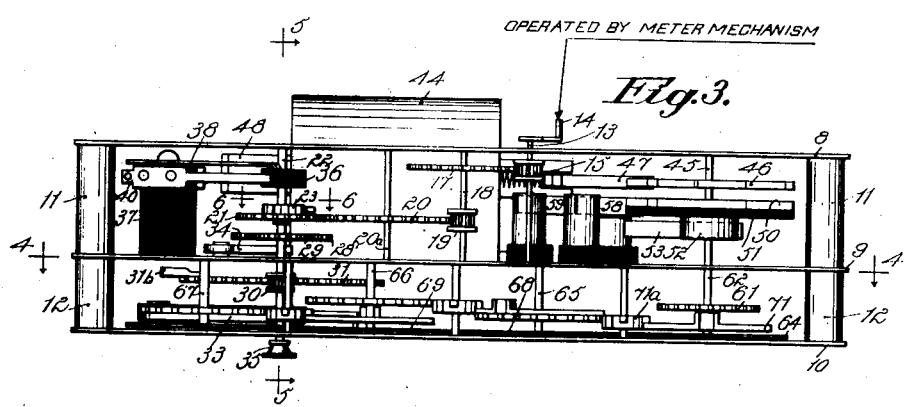

My invention is illustrated in the accompanying drawings, in which;

Figure 1 is a front elevational view of the device of my invention. Fig. 2 is a rear elevational view of the same, the back plate being largely broken away to show the mechanism within. Fig. 3 is a bottom view of the mechanism. Fig. 4 is a view thereof taken on the line 4—4 of Fig. 3 looking in the direction indicated by the arrows. Fig. 5 is a fragmentary cross sectional view taken on the line 5—5 of Fig. 3 and looking in the direction indicated by the arrows. Fig. 6 is a fragmentary cross sectional view taken on the line 6—6 of Fig. 3 and looking in the direction indicated by the arrows; and Fig. 7 is a diagrammatic representation of an arrangement wherein the charge for integrated electricity above a certain amount is higher than the charge for the first predetermined quantity.

Similar reference numerals refer to similar parts throughout the several views.

Referring to Figs. 1 to 6 inclusive, it will be seen that the device of my invention comprises three plates 8, 9 and 10, the plates 8 and 9 being separated by posts 11, and plates 9 and 10 being separated by posts 12. A shaft 13 bears in plates 8 and 9 and extends through plate 8 to the rear of the device, where it it provided with a crank 14, adapted to engage a suitable locking dog or other device (not shown) operatively connected with a meter mechanism driven by the electricity the charge for which is to be integrated. The shaft 13 is provided with a pinion 15, which pinion meshes with a gear 17, mounted upon a shaft 18, bearing in plates 8 and 9. The gear 17 constitutes one element of a chain of reduction gearing comprising the pinion 19, also mounted upon shaft 18, and a gear 20, with which the pinion 19 meshes. The gear 20 is mounted upon a shaft 20$^a$ bearing in plates 8 and 9, as shown. The gear 20 meshes with the gear 21 loosely mounted upon a shaft 22, said shaft 22 bearing in plates 8 and 9, as illustrated. Rigidly mounted upon shaft 22, is a ratchet wheel 23. A pawl 24 pivoted to the gear 21 is normally held in engagement with the ratchet wheel 23, by means of a spring 25, all of which is clearly illustrated in Figs. 5 and 6.

When the parts are in the position illustrated in the drawings, the loosely mounted gear 21 meshes with a gear 26, mounted upon a shiftable shaft 27. As illustrated most clearly in Fig. 5, the shaft 27 bears in plate 8, extends through a slot in plate 9 and bears in a slot 28 in plate 10. Mounted upon the shaft 27 with the gear 26, is a larger gear 28′, adapted to engage a gear 29, mounted upon the shaft 22. Owing to the gear ratios, it will be readily seen that with the several parts of my device in the positions shown in the drawings, the speed of rotation imparted to gear 21 by its coacting gear 20 of the reduction train, is increased when transmitted to shaft 22, through the train comprising gears 26 and 28′.

The movable shaft 27 is provided with a pinion 30, normally meshing with the notched gear 31, mounted upon a movable shaft 32. The gear 31 is provided with a notch 31$^a$, and a guide arm 31$^b$, as shown. As most clearly illustrated in Fig. 5, the shaft 32 has one end thereof bearing in plate 8, extends through a slot in plate 9, and bears in a slot 32$^a$ in plate 10. A spring 33, supported by the plate 10, normally holds the movable shaft 32 in the position illustrated in the drawings. A spring 34, supported by plate 9, normally tends to move the shaft 27 and pinion 30 toward notched gear 31. The shaft 32 is provided with a milled button 35, which may be readily grasped to shift the shaft 32 against the tension of spring 33. This button is located in the front of the device, as clearly shown in Fig. 1.

Mounted upon the shaft 22, is a commutator 36, comprising an insulating disk and a conductor arm extending to the periphery thereof. A block of insulating material 37 carried by the plate 9 is provided with a brush contact 38 electrically connected with the conductor element of the commutator at all times. Said insulating block also carries brush contacts 39 and 40, bearing upon the periphery of the commutator disk and adapted to electrically engage the conductor arm thereof as said commutator rotates. The brush contact 38, is connected by means of a conductor 41 with a local source of current 42, which is in turn connected by means of a conductor 43, with one terminal of the solenoid 44.

As clearly illustrated in Figs. 2, 3 and 4, a shaft 45 has its ends bearing in plates 8 and 10 and extends through plate 9. This shaft is provided with a ratchet wheel 46, adapted to be engaged by the pawl 47, of the solenoid core 48. A spring 49 normally tends to retain the core and pawl in the positions shown in Fig. 2. Mounted upon the shaft 45 is a special commutator device comprising ratchet wheels 50 and 51, of conductive and insulating material respectively. The ratchet wheels are so disposed that the teeth thereof are staggered relatively to each other. The conductive commutator member 50 is provided with a sleeve conductor 52, upon which rides a brush contact 53, carried by an insulated post 54 supported by the plate 9. This post 54 is electrically connected by conductor 55 with the second terminal of the solenoid 44. Supported by suitable insulated posts 56 and 57, are brush contacts 58 and 59. Each of these brush contacts is of a width substantially equal to the thickness of the said commutator device. As illustrated most clearly in Fig. 2, brush contact 58 is in engagement with one of the teeth of the insulation ratchet of the commutator when brush 59 is in engagement with the conductive ratchet, and vice versa. The posts 56 and 57 are electrically connected, respectively, with the brushes 40 and 39, which ride upon the commutator 36.

Mounted upon the shaft 45, is a gear 60, which meshes with a gear 61, mounted upon the shaft 62, of a cents or units numeral wheel 64. Mounted respectively upon shafts 65, 66 and 67 are the tens, hundreds, and thousands numeral wheels indicated at 68, 69 and 70, respectively. Carry over gearing is provided for imparting to each numeral wheel of higher order one-tenth of a revolution for each complete revolution of the adjacent numeral wheel of next lower order. Said carry over gearing comprises carry over disks 71, and idler pinions 71ª, said disks and pinions coöperating in a well known manner to effect the necessary carry over. Due to the gearing through which the notched gear 31 is driven when the several parts are in the position shown, it will be seen that the rotation of the gear 31 is directly proportional to the amount of electricity passed through the meter with which the device is associated. In the use of the device, the amount of electricity to be charged for at a certain rate is determined by the position of the notch 31ª of the gear 31, relatively to pinion 30. This may be readily accomplished by providing a graduated scale upon the front face of a disk 35ª mounted upon the shaft 32, said graduated scale being visible through an aperture 35ᵇ in the plate 10.

After the notched gear has been duly set and electricity is passed through the meter with which the device is associated, the operation is as follows: Rotation of the crank 14 and shaft 13 is transmitted from reduction gears 18 and 20, to loosely mounted gear 21, thence through gears 26 and 28', to gear 29, mounted upon shaft 22. Due to the gear ratios, shaft 22 and ratchet wheel 23 rotate faster than loosely mounted gear 21; therefore pawl 24 slips from tooth to tooth as the ratchet wheel moves ahead of the gear 21. As the shaft 22 is rotated, the conductor arm of commutator 36 is alternately brought into electrical engagement with brush contacts 39 and 40. Assuming the commutator to be in the position shown and rotating in a clockwise direction, the conductor arm of the commutator first engages the brush contact 39, whereupon the circuit for the solenoid is completed through brush 59, the commutator ratchet 50, and brush 53. The solenoid thereupon is energized and the pawl 47 is brought into engagement with its coacting ratchet advancing the said commutator devices one step and shifting the positions of the brushes 58 and 59 relatively to the insulation and conductor portions of the said commutator devices. When the conductor arm of commutator 36 rotates one-half of the revolution more the above operation is repeated except that the solenoid circuit is this time closed through brushes 40 and 58. Rotation of the shaft 45 is imparted to the numeral wheels by means of the gear 60 carried thereby which meshes with the gear 61 on the shaft of the units numeral wheel. The gear ratios of the gear trains just mentioned are such that the amount of movement of the numeral wheels is sufficient to so position the numeral wheels that the amount represented through the suitable openings in plate 10 is the amount to be charged for the electricity consumed.

As the operation above set forth takes place the gear 31 is loosely rotated in the direction indicated by the arrow in Fig. 4, until the notch 31ª thereof comes into register with its driving pinion 30. When the notch 31ª comes into register with the pinion 30, spring 34 moves the shaft 27 to the position shown in dotted lines in Fig. 5, whereupon gears 26 and 28' are withdrawn from engagement with their coacting gears. Due to the gear ratios the notch 31ª does not come into register with pinion 30 until a certain predetermined amount of electric energy has been consumed. The gear 31 is preferably provided with an arm 31ᵇ disposed adjacent the notch 31ª to prevent the notch 31ª from being carried past the pinion 30 when the gear 31 is rotated. After the shaft 27 has moved to the position shown in dotted lines in Fig. 5, motion transmitted from crank 14 to gear 21 through the intervening reducing train is transmitted to shaft 22 through pawl 24, and its coacting ratchet wheel 23. Due to the fact that the rotation of the gear 21 is imparted to shaft 22 direct, instead of through an increasing train, actuations of the solenoid are less frequent and so the amounts indicated by the numeral wheels by a certain quantity of electricity passing through the meter is less than would be indicated by the numeral wheels by the same amount of electricity with the increasing gears introduced between gear 21 and the shaft 22. After the machine has been operating on the lower rate and it is desirable to have it again operate on the higher rate, the shiftable shaft 32 is moved to the position shown in dotted lines in Fig. 5. Gear 31 is then rotated to position corresponding to the amount of electricity to be integrated at the high rate. The shaft 32 is then released, whereupon the shafts 32 and 27 assume the position illustrated in the drawings and bring the increasing gearing between loosely mounted gear 21 and its shaft 22.

As illustrated most clearly in Fig. 2, the solenoid core 48 is notched at 72, in order that the shaft 32 may be shifted for the resetting operation.

In Fig. 7, is diagrammatically illustrated a device so constructed that the charge for a predetermined amount of electricity is indicated by the numeral wheels at a comparatively low rate, the rate being increased after said predetermined amount of current has been integrated. In the arrangement illustrated, power from the meter driven shaft 100, is transmitted to shaft 101, through reduction gearing comprising pinions 102 and 103, and their coacting gears 104 and 105. The shaft 101 is fixed at 101ª so that gear 105 is at all times in mesh with pinion 103. When the various elements are in the position shown, movement of the shaft 101 is transmitted to shaft 106 through gear 107, pinion 108, and gear 109. Shaft 106 is provided with a pinion 110, which meshes with a notched gear 111, mounted upon shiftable shaft 112. This gear 111 conforms to the notched gear 31 of the device illustrated in Figs. 1 to 6 inclusive. Shaft 106 is also provided with a disk 113, adapted to mesh with the gear 114, mounted upon fixed shaft 115, which carries a commutator 116, conforming to the commutator 36 of the device hereinbefore described. A commutator device 117, ratchet 118 and solenoid 119 are similar to and operate precisely as do the corresponding parts shown in connection with the devices illustrated in Figs. 1 to 6 inclusive.

When in the operation of the device illustrated in Fig. 7 a predetermined amount of electricity has been integrated, and the notch of gear 111 has been driven into register with pinion 110, the spring 120, shifts the left hand end of shafts 101 and 106, thus drawing pinion 113 out of mesh with gear 114, of shaft 115, and driving the relatively large gear 121 mounted upon shaft 101 into mesh with pinion 122 of the shaft 115. Owing to the gear ratios rotation of the shaft 115 after the shifting of shafts 101 and 106 has taken place is greater than before said shifting is effected. Thus the amount registered by the numeral wheels is greater after than before shifting of shafts 101 and 106 has taken place. Of course the arrangement illustrated in Fig. 7 is purely diagrammatic, but from the disclosure of Figs. 1 to 6 inclusive and its diagrammatic illustration it would be a simple matter for anyone skilled in the art to construct a device which integrates in itself and registers at a predetermined rate for a first quantity of electricity, and at a higher rate after the predetermined quantity has been integrated.

While I have illustrated and described a specific embodiment of my invention in connection with an electricity metering system it will be understood that my invention is not limited to such use. In the appended claims the word "fluid" has been employed to designate broadly electricity and any gas or liquid capable of being metered.

While I have illustrated in my invention in the particular embodiments therein shown and described, I do not wish to be limited to these particular constructions but desire to claim any equivalents thereof which may suggest themselves to those skilled in the art.

What I claim is:

1. Variable rate metering mechanism comprising a shaft driven at a rate proportional to the consumption of the fluid to be integrated, indicating devices, transmission mechanism whereby said indicating devices are driven at a certain speed proportional to the speed at which said shaft is driven until a certain pre-determined amount of fluid has been integrated, and means operated by the transmission mechanism arranged and adapted to connect said shaft and indicating devices at a different ratio to drive the indicating devices at a different speed proportional to the speed at which said shaft is driven after said pre-determined amount of fluid has been integrated.

2. Variable rate metering mechanism comprising an indicating device, a shaft driven by the fluid to be integrated, connections between said shaft and said device including a second shaft, a driven gear loosely mounted on said second shaft, a second gear and ratchet wheel rigidly mounted on said second shaft, a pawl carried by said loosely mounted gear normally engaging said ratchet wheel, gearing normally interposed between said loosely mounted gear and said second gear, and means operatively connected with said first mentioned shaft for disengaging said last mentioned gearing from the pair of gears coöperating therewith when a pre-determined quantity of fluid has been integrated.

3. Variable rate metering mechanism comprising an indicating device, a shaft driven by the fluid to be integrated, connections between said shaft and said device comprising a gear train including a second shaft, a loosely mounted driven gear on said shaft, a ratchet wheel and a second gear rigidly mounted on said second shaft, a pawl carried by said loosely mounted gear normally engaging said ratchet wheel, a shiftable shaft normally disposed parallel to said second shaft, gears mounted on said shiftable shaft normally engaging the gears of said second shaft, a pinion on said shiftable shaft, a second shiftable shaft, a notched gear mounted thereon meshing with said pinion, and means adapted to shift the first shiftable shaft when the notched gear has been rotated to a predetermined position.

4. Variable rate metering apparatus comprising a shaft driven by the fluid to be integrated, an indicating device, transmission mechanism between said shaft and the indicating device, and devices operated by said transmission mechanism whereby said indicating device is connected with said first mentioned shaft in a different ratio when a pre-determined amount of fluid has been integrated.

5. Variable rate metering mechanism comprising a shaft driven by the fluid to be measured, an indicating device, transmission mechanism interposed between the shaft and the indicating device whereby the indicating device is driven at a certain rate proportional to the rate of operation of said shaft, a setting member mechanically connected with said transmission mechanism and driven therefrom, and mechanism automatically operable to connect the indicating device with said shaft in a different ratio when the setting member has been driven to a pre-determined position.

6. Variable rate metering mechanism comprising a shaft driven by the fluid to be measured, an indicating device, transmission mechanism interposed between the shaft and the indicating device whereby the indicating device is driven at a certain rate proportional to the rate of rotation of said shaft, said transmission mechanism comprising a shiftable shaft, a pinion mounted on said shiftable shaft, a notched gear adapted to mesh with said pinion, means for setting said notch with respect to said pinion, and means arranged to shift said shiftable shaft when said gear is rotated to a position such that said notch is adjacent said pinion.

7. Variable rate metering mechanism comprising a shaft, a gear wheel driven at a rate proportional to the fluid to be integrated loosely mounted on said shaft, a ratchet wheel disposed adjacent the gear wheel and nonrotatable on the shaft, a pawl carried by the gear wheel riding on the ratchet wheel, a second gear wheel non-rotatable on said shaft, a shiftable shaft, gear wheels non-rotatable on said shiftable shaft arranged to mesh with the gears of the first shaft when the shiftable shaft is in one of its positions, said first shaft being driven through the pawl and ratchet from the loosely mounted gear when the gear wheels of the shiftable shaft are not in mesh with the gear wheels of the first shaft, and through the gear wheels of the shiftable shaft when the latter gear wheels are in mesh with the gear wheels of the first shaft.

8. Variable rate metering mechanism comprising a shaft, a gear wheel loosely mounted on the shaft driven from the rotating element of a meter, a ratchet wheel non-rotatable on the shaft, a pawl carried by said gear wheel riding on said ratchet wheel, a second gear wheel non-rotatable on the shaft, shiftable gearing normally interposed between said gear wheels, a setting wheel normally retaining the shiftable gearing in operative position, said setting wheel being driven from said shiftable gearing, and a device adapted to move said shiftable gearing from operative position when a predetermined amount of actuation of the setting wheel has been effected.

9. A variable rate metering mechanism comprising in combination a shaft driven at a rate proportional to the consumption of the fluid to be metered, an indicating device, transmission gearing normally operatively connecting said shaft and indicating device, and mechanism controlled from said shaft arranged to connect said shaft with the indicating device in a different ratio after a predetermined quantity of fluid has been metered.

10. A variable rate metering mechanism comprising in combination a member driven from the movable element of a meter at a rate proportional to the consumption of the metered fluid, an indicating device, means adapted to connect the said member with the indicating device whereby the indicating device is driven from said member at a certain rate proportional to the rate of operation of said member, and mechanism controlled from said member arranged to establish a different connection between said member and the indicating device after a predetermined amount of fluid has been metered whereby the indicating device is thereafter driven at a different rate proportional to the rate of operation of said element.

11. A variable rate metering mechanism, comprising in combination a member adapted to be driven at a rate proportional to the consumption of the fluid to be metered, an indicating device, mechanism normally connecting the indicating device with said member whereby the indicating device is driven at a certain rate proportional to the rate of operation of said member, mechanism arranged to establish a different connection between said member and the indicating device after a pre-determined amount of fluid has been metered, a device driven from said member arranged when moved to a certain position to permit the operation of said last mentioned mechanism, and means for manually setting said device to change the connections after any desired quantity of fluid has been metered.

In witness whereof, I hereunto subscribe my name this 7th day of January, A. D. 1913.

GEORGE H. MYRICK.

Witnesses:
LEONARD E. BOGUE,
LESLIE W. FRICKE.